United States Patent [19]
Akers et al.

[11] Patent Number: 5,016,699
[45] Date of Patent: May 21, 1991

[54] AWNING COVER

[76] Inventors: Oliver C. Akers, 110 Honeysuckle La.; Verlin C. Spurlock, 5642 Shawnee Dr., both of Huntington, W. Va. 25701

[21] Appl. No.: 362,970
[22] Filed: Jun. 8, 1989
[51] Int. Cl.[5] .............................................. E04F 10/00
[52] U.S. Cl. ...................................... 160/22; 160/44; 135/89
[58] Field of Search ....................... 160/22, 66, 45, 44; 135/89; 248/544, 558

[56] References Cited
U.S. PATENT DOCUMENTS

| | | |
|---|---|---|
| 827,483 | 7/1906 | Voorhees . |
| 1,390,527 | 9/1921 | Gray . |
| 1,768,437 | 6/1930 | Cara et al. . |
| 1,779,561 | 10/1930 | Schuler . |
| 2,506,285 | 5/1950 | Wagner ................................. 160/22 |
| 3,001,577 | 9/1961 | Anderson . |
| 3,364,973 | 1/1968 | Railson . |
| 3,730,196 | 5/1973 | Borskey . |
| 3,833,011 | 9/1974 | Duffy . |
| 3,923,074 | 12/1975 | McKee . |

Primary Examiner—Blair M. Johnson
Attorney, Agent, or Firm—Young & Thompson

[57] ABSTRACT

An awning cover assembly for use in protecting an awning installed on recreational vehicles and mobile homes or the like is provided, wherein a first end of said awning is attached to a vertical mounting surface and a second end of said awning is connected to an extendable arm of an awning bracket supported on said vertical mounting surface by an awning bracket holder, the improvement wherein said awning cover assembly comprises:

an elongated hood member including open rear and bottom portions, protective top and front portions, and opposing protective side portions extending rearwardly and downwardly from said front and top portions, respectively;

mounting mechanism pivotally attached to the rear of said top portion of said hood member, said mounting mechanism permitting said hood member to be rotated upwardly and rearwardly upon mounting of said hood member on said vertical mounting surface, and a connector which cooperatively engages in fixed position both an upper portion of said awning bracket holder and said mounting bracket.

35 Claims, 7 Drawing Sheets

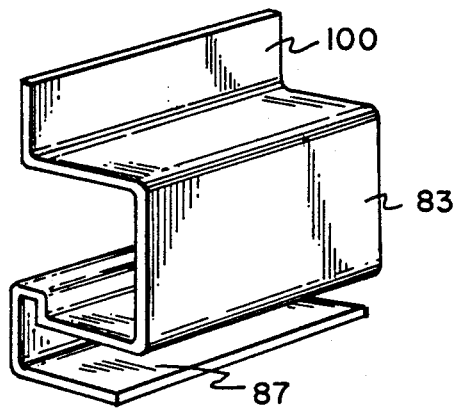
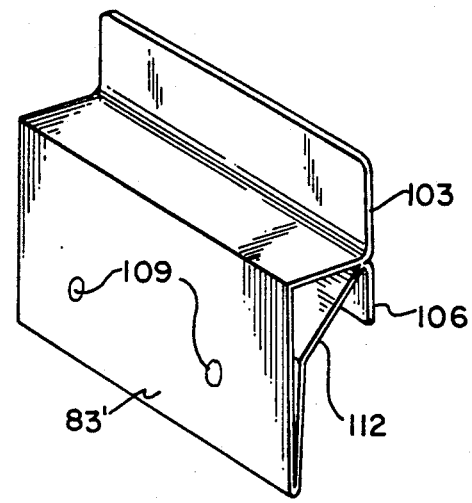
FIG. 18  FIG. 19
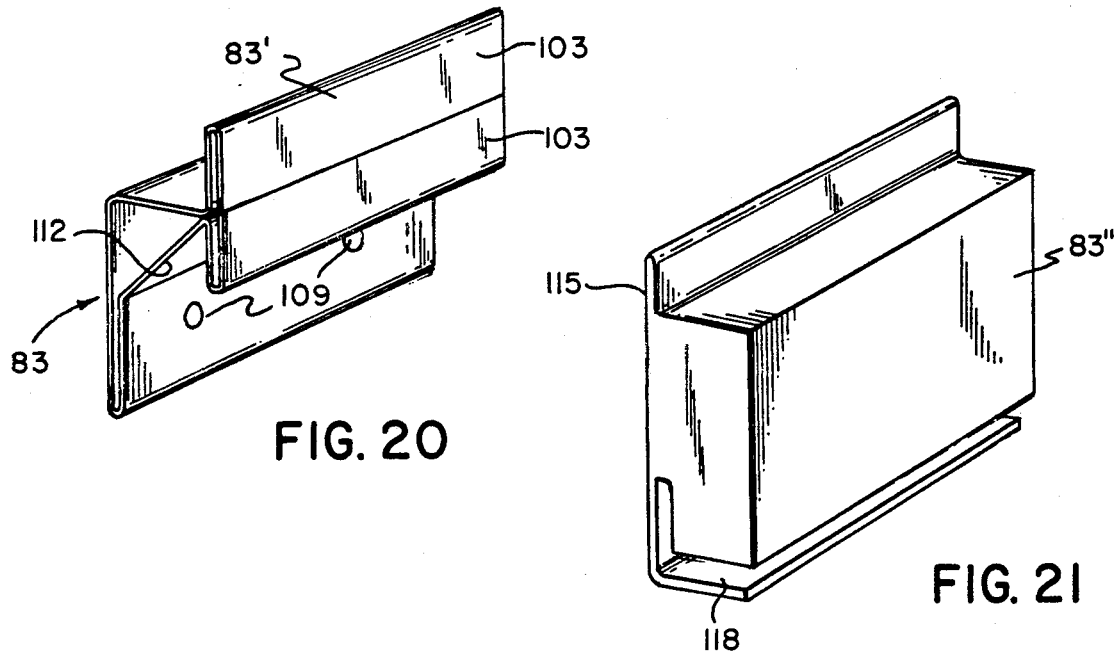
FIG. 20  FIG. 21

AWNING COVER

BACKGROUND OF THE PRESENT INVENTION

The present invention is directed to an awning cover for use in protecting extendable awnings of various types such as those employed in recreation vehicles.

Extendable awnings of many types and sizes are known which may be positioned over doors and/or windows of mobile homes, recreational vehicles, camping trailers or the like. Such awnings generally consist of an awning fabric or material in a rolled up but extendable form and attached at one end to a vertical wall. The awning fabric or material at its other end is attached to a roller adapted to cause said fabric or material to roll up around the roller when not in use. Pivot arms permit the awning fabric or material to be positioned adjacent the wall in rolled up form when not in use and to be extended from the wall when in use.

Such awnings are frequently left either unprotected or insufficiently protected from the atmospheric elements. For instance, waterproof awning covers are known which extend across the top of the awning and roll up around the awning when the awning is retracted. Such covers obviously fail to protect the ends of the awning when in rolled up form. In such instances, moisture is permitted to wick between the various rolled up portions of the awning fabric or material to the detriment of the fabric or material. Such wicking action frequently occurs during use of a recreational vehicle under moist conditions such as during rainstorms. Rain impacts on the leading end of the awning, with interior portions of the rolled up awning becoming wet due to the resultant wicking action.

Awning hoods are also known which are intended to protect retracted awnings from the elements. Exemplary awning hoods are described, for example, in U. S. Pat. Nos. 827,483; 1,390,527; 1,768,437; 1,779,561; 3,001,577; 3,364,973; 3,730,196; 3,833,011; and 3,923,074.

While the awning hoods described in the noted patents are designed to protect the retracted awning, the disclosed awning hoods are still deficient in certain respects such as failing to adequately protect all exposed sides of the retracted awning and/or only permitting access to the awning with difficulty.

OBJECTS AND SUMMARY OF THE INVENTION

It is thus one object of the present invention to provide means to protect retracted awnings from the atmospheric elements such as rain.

It is further an object of the present invention to provide means to protect awnings during storage of same which protects all exposed portions of the rolled up awning.

It is still further an object of the present invention to provide means to protect awnings which readily permits the awning to be extended for use.

It is yet further an object of the present invention to provide an awning protection means which may be easily installed on a recreational vehicle subsequent to installation of the awning.

It is still yet another object of the present invention to provide an awning hood which is particularly adapted to protect awnings attached to recreational vehicles.

It is still yet another object of the present invention to provide an awning hood which readily permits access to the retracted awning for maintenance and/or removal.

In accordance with the present invention, there is provided an awning cover particularly suitable for use in protecting awnings installed on recreational vehicles and mobile homes or the like, said awning cover comprising:

an elongated hood member including open rear and bottom portions, protective top and front portions, and opposing protective side portions extending rearwardly and downwardly from said front and top portions, respectively;

said front portion including a trough which extends along a lower edge thereof adapted to collect and divert water which runs downwardly from an upper portion of said hood member to said lower edge;

drainage means positioned in at least one of said side portions in communication with said trough to permit water collected by said trough to be diverted to and discharged from a side of said hood member; and mounting means pivotally attached to the rear of said top portion of said hood member, said mounting means permitting said hood member to be rotated upwardly and rearwardly upon mounting of said hood member on a vertical mounting surface.

In accordance with the present invention, there is also provided an awning cover assembly for use in protecting an awning installed on recreational vehicles and mobile homes or the like, a first end of said awning being attached to a vertical mounting surface and a second end of said awning being connected to an extendable arm of an awning bracket supported on said vertical mounting surface by an awning bracket holder, the improvement wherein said awning cover assembly comprises:

an elongated hood member including open rear and bottom portions, protective top and front portions, and opposing protective side portions extending rearwardly and downwardly from said front and top portions, respectively;

mounting means pivotally attached to the rear of said top portion of said hood member, said mounting means permitting said hood member to be rotated upwardly and rearwardly upon mounting of said hood member on said vertical mounting surface, and connector means to retain cooperatively engage in fixed position both an upper portion of said awning bracket holder and said mounting bracket.

In accordance with the present invention, there is further provided an awning cover assembly for use in protecting an awning installed on recreational vehicles and mobile homes or the like, a first end of said awning being attached to an awning rail a portion of which extends from the side of a vertical mounting surface and a second end of said awning being connected to an extendable arm of an awning bracket supported on said vertical mounting surface, the improvement wherein said awning cover assembly comprises:

an elongated hood member including open rear and bottom portions, protective top and front portions, and opposing protective side portions extending rearwardly and downwardly from said front and top portions, respectively; and mounting means pivotally attached to the rear of said top portion of said hood member, said mounting means permitting said hood member to be rotated upwardly and rearwardly upon mounting of said hood member on said vertical mounting surface, said mounting means including a substantially L-shaped mounting bracket, a first leg of said L-shaped mounting bracket being attached to a rear portion of said top portion of said hood member and extending rearwardly therefrom, and a second leg of said L-shaped mounting bracket extending downwardly from said first leg, a lower portion of said downwardly extending second leg adapted to be supported by said portion of said awning rail extending outwardly from said vertical mounting surface, an awning bracket holder, a lower portion of said awning bracket holder adapted to receivably retain an end of said awning bracket to be supported on said vertical mounting surface, connector means to retain said upper portion of said awning bracket holder adjacent to said awning rail, said connector means including in a lower portion thereof a channel adapted to slidably receive said upper portion of said awning bracket holder, and means to attach an upper portion of said connector means to said mounting bracket.

BRIEF DESCRIPTION OF THE DRAWINGS

The present invention is described in connection with the following Figures:

FIG. 18 is a view in perspective of the connector means of FIG. 14.

FIG. 19 is a view in perspective of another embodiment of the connector means of the present invention as viewed from the front portion thereof.

FIG. 20 is a view in perspective of the connector means of FIG. 19 as viewed from the rear thereof.

FIG. 21 is a view in perspective of another embodiment of the connector means of the present invention as viewed from the front portion thereof.

DETAILED DESCRIPTION OF THE PRESENT INVENTION

The awning cover of the present invention is capable of fully protecting a retracted or rolled up awning positioned beneath the cover as well as being capable of being easily installed and readily moved away from the awning to permit the awning to be moved into a fully extended position, inspected and/or removed, etc.

Figure 1:
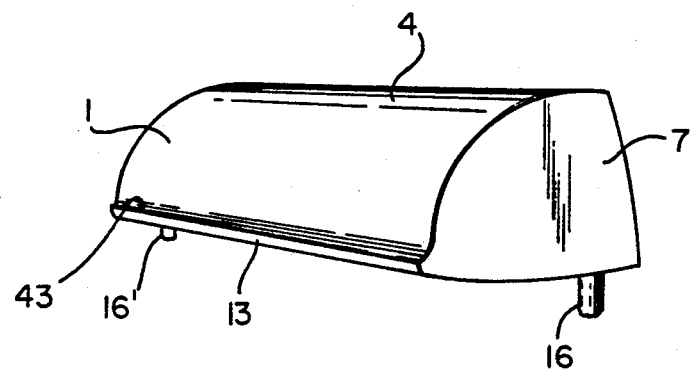
FIG. 1 is a view in perspective of one embodiment of the awning cover of the present invention.

As shown in the Figures, in one embodiment the awning cover of the present invention comprises a hood member (FIG. 1) comprised of front surface 1 and top surface 4. Opposing side portions 7, 7' extend rearwardly and downwardly from the front and top surfaces, respectively, to points coextensive with the rearmost and frontmost portions of the hood. The hood member is open-ended at both the rear and the bottom thereof as shown in FIG. 2.

Figure 2:
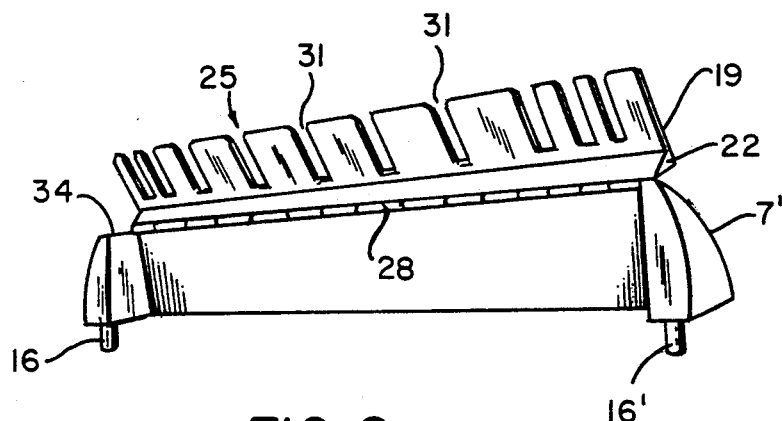
FIG. 2 is a rear view of the awning cover of one embodiment of the present invention in an uninstalled state depicting the attachment bracket in raised position.
Figure 8:
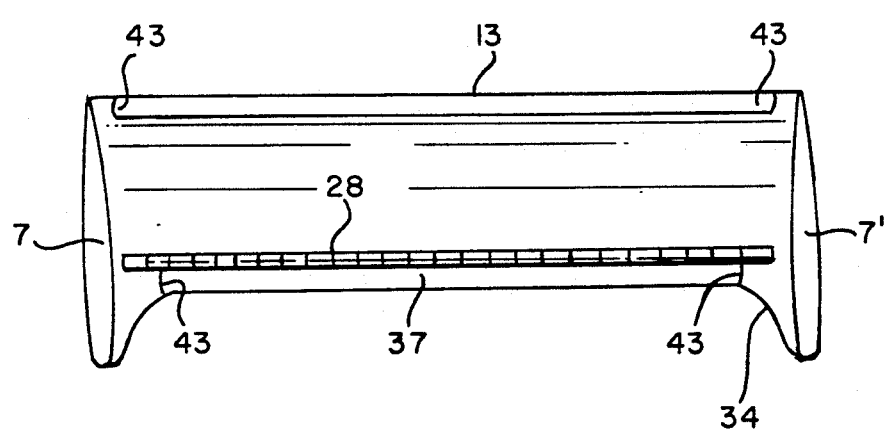
FIG. 8 is a top view of one embodiment of the awning cover of the present invention.

As also shown in FIGS. 2 and 8, the respective side portions slope inwardly from the bottom of same to the top. This configuration serves to divert water which strikes the side of the cover (such as during the driving of a recreational vehicle) toward the top of the cover so as to minimize the amount of water diverted and/or retained under the awning cover and which would normally contact the retracted awning.

The hood member preferably includes a notched portion 34 (FIGS. 2 and 8) which facilitates the pivoting of the hood member upwardly.

While mention is made of front and top surfaces 1, 4, the Figures depict such surfaces in the form of a single curved surface which extends from a topmost rear portion of said hood member to a lower front portion thereof. Alternatively, but not shown in the Figures, the hood may take the form of a non-curved surface such as where a top and front surface intersect at an angle to form a distinct intersecting line.

Figure 7:
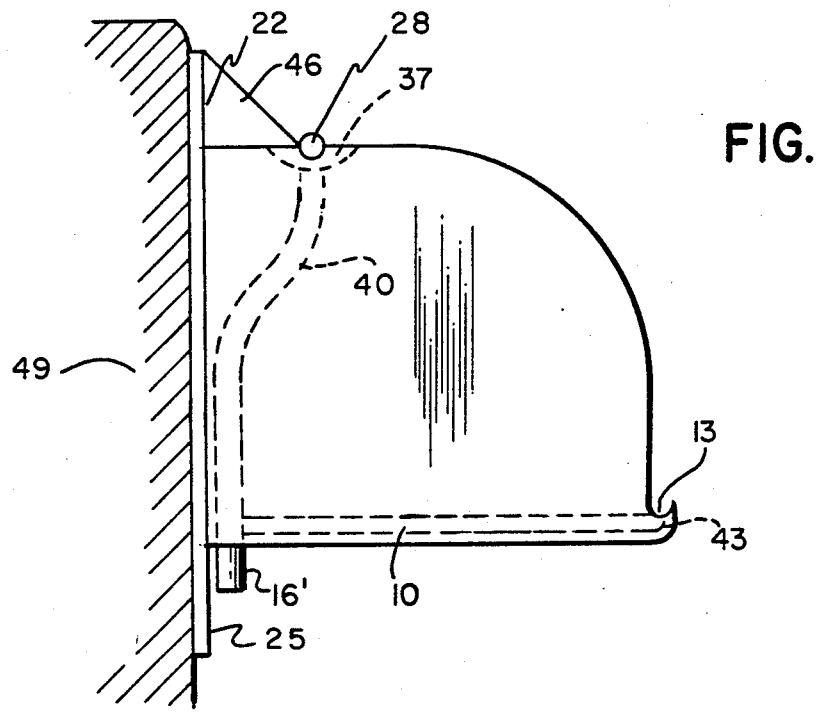
FIG. 7 is a side view of one embodiment of the awning cover of the present invention depicting the drainage means.

The hood member preferably includes a drainage trough 13 along a lower portion of the front surface adapted to collect and divert water which runs down from the top of said hood member. The hood member further includes in one embodiment drainage means 16, 16' at the sides of the hood member which are in communication with trough 13 via drainage line 10 (FIG. 7). Drainage means comprise in a preferred embodiment drainage tubes 16, 16' which extend downwardly from the rear of the hood member. Water which is collected by drainage trough 13 is diverted and discharged to the side of the awning cover, thus protecting any door or window which may be positioned below the awning 15 as well as protecting the extended awning from water which may drip from the hood.

Figure 9:
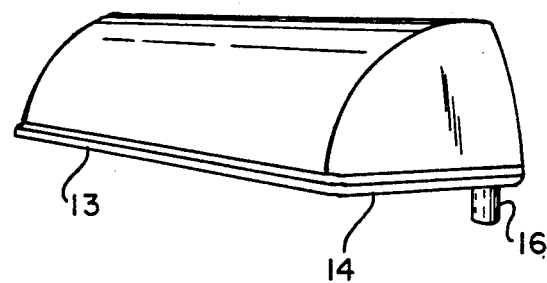
FIG. 9 is a view in perspective of another embodiment of the awning cover of the present invention.

In an alternative embodiment, trough 13 may include side extensions 14, 14' (FIGS. 9, 10 and 11) which include drainage tubes 16, 16' at rearward portions thereof.

In order to inhibit the drainage of water between the rear of the hood member and the mounting surface in the FIG. 2 embodiment, a second drainage trough 37 (FIGS. 7 and 8) is positioned along the rearward edge of the notched portion 34 to collect and divert water which may pass through the hinge means. Means 40 (FIG. 7) are also provided to discharge water collected in this additional drainage trough to drainage means 16, 16'. The first leg 22 of the mounting bracket is preferably dimensioned to cover the notched portion when the hood member is placed in its downward protective position.

Figure 6:
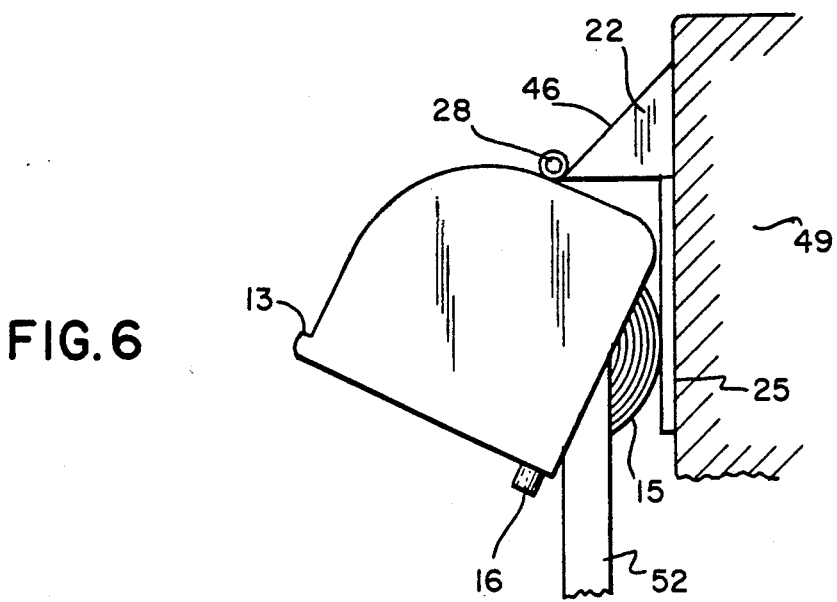
FIG. 6 is a side view of one embodiment of the awning cover in partially raised position.

As a result of the spacing of the hinge means a distance from the mounting surface due to the presence of the notched portion 34, the awning cover may be advantageously pivoted both upwardly and rearwardly when being rotated to a position which permits extension of the awning during use and/or repair or inspection of same. Advantageously, the first leg of said mounting means includes a sloped surface 46 adapted to divert water which falls to the rear of the cover toward drainage trough 37. As shown in FIGS. 6 and 7, sloped surface 46 extends from the vertical mounting surface 49 to the hinge means 28.

FIG. 8 depicts an embodiment of the present invention wherein two drainage troughs 13, 37 are employed along the front and rear portions of the hood, respectively. Drain holes 43 at each end of the respective troughs enable water collected in the troughs to be discharged through drainage lines 10, 40 (FIG. 7). Such troughs are thus not "open-ended" per se but communicate at each end with the respective drainage lines. Positioned immediately forward of the drainage trough 37 is hinge means 28 connected to the attachment means (not shown in FIG. 8). Trough 37 thus collects water which drains through the hinge means and/or along the rear of the hood and diverts same to the side of the awning cover to provide additional protection for the awning when stored in a retracted state.

The present invention also comprises an improved means of attachment of the awning cover to a vertical mounting surface.

The awning cover includes mounting means 19 pivotally attached to the rear of said top portion of said hood member. The mounting means 19 permits the hood member to be rotated both upwardly and rearwardly upon being mounted on a vertical mounting surface 49 such as the side of a recreational vehicle or mobile home.

The mounting means 19 may be pivotally attached to the hood member by hinge means 28. While hinge means 28 preferably extends along substantially the entire width of the hood member, the hinge means need only extend along a portion of the hood member sufficient to adequately support the hood member on the mounting means.

In one embodiment, a "piano hinge" mechanism (FIG. 2) is employed to attach the mounting bracket to the hood member.

Alternatively, a C-hinge mechanism (FIGS. 10–12) is employed to attach the mounting bracket to the hood member. The C-hinge exemplified includes male member 29 and female member 30.

Figure 10:
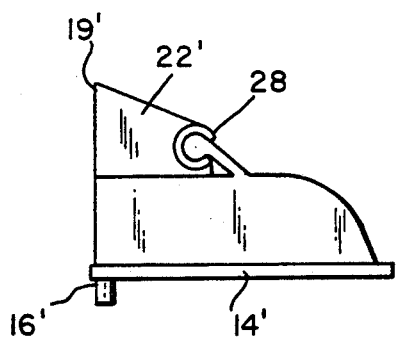
FIG. 10 is a side view of the embodiment of the awning cover of FIG. 9.
Figure 11:
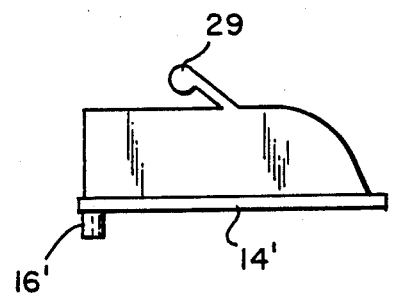
FIG. 11 is a side view of a portion of the awning cover of FIG. 9.

In the embodiment of FIGS. 10 and 11, drainage trough 37 is not required since the C-hinge mechanism 29, 30 adequately diverts water along the top of the hood.

The mounting means 19 preferably comprises an elongated L-shaped mounting bracket.

In one embodiment (FIGS. 2, 6 and 7), the first leg 22 of the L-shaped mounting bracket is attached to the rear of the top portion of said hood member. The second leg 25 of the mounting bracket extends downwardly and includes means to attach the mounting bracket (and hence the awning cover) to a vertical mounting surface. Such means preferably comprises elongated downwardly open-ended slots 31 which are adapted to be positioned in mounting relationship to the bolt or screw means normally employed to attach the awning itself to the mounting surface. That is, once the bolts or screws which serve to mount the awning to the mounting surface are loosened, correspondingly positioned slots 31 in said mounting means may be positioned over the bolt or screw and the bolt or screw tightened to attach both the awning and the awning cover to the vertical mounting surface.

Such means of attachment enables the awning cover to be placed in protective position to the awning 15 without the need to remove the awning. The need to form new mounting holes in the mounting surface is also negated as the awning cover may simply be slid into position over the awning. Such means of attachment also enables the cover to be readily removed once mounted about the awning.

Figure 12:
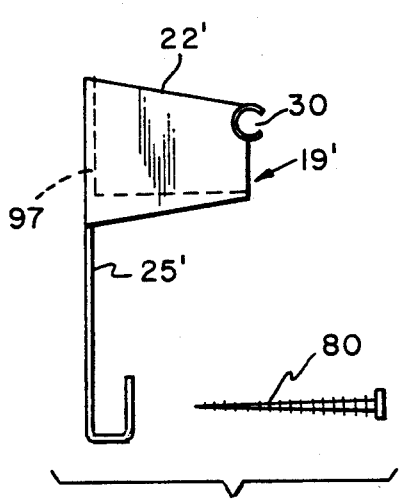
FIG. 12 is a side view of the mounting bracket of the awning cover of FIG. 9.

Alternatively, mounting means 19' may comprise an elongated L-shaped mounting bracket which includes a first leg 22' attached to the rear of said top portion of said hood member (FIG. 12). A second leg 25' of said L-shaped vertical mounting bracket includes means to attach said bracket to a mounting surface.

Figure 13:
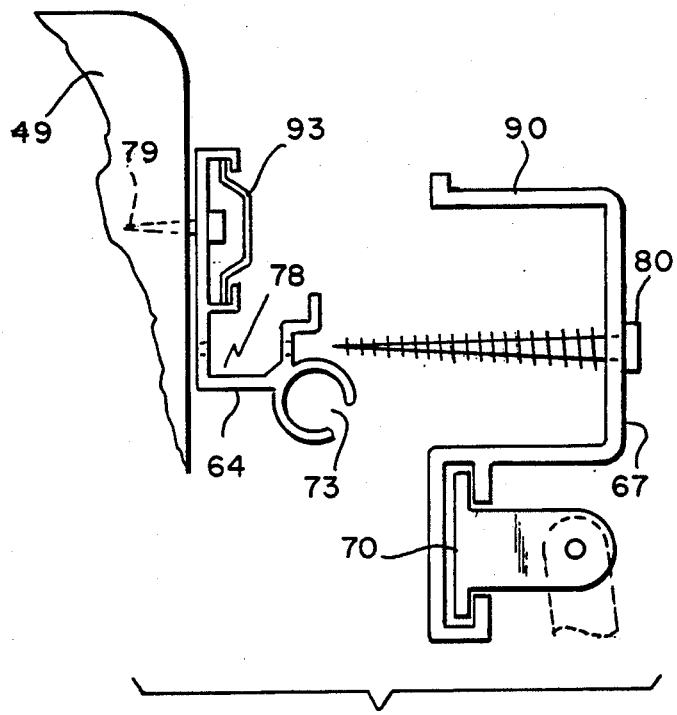
FIG. 13 is a side view of the awning bracket holder and awning nail.

FIG. 13 depicts a side view of an awning bracket holder 67 and awning rail 64 which are employed in one conventional embodiment to anchor an awning to a vertical mounting surface. In the depicted embodiment, an awning bracket holder 67 (which supports an end of the awning bracket) and an awning rail are each adapted via screw means 79, 80 to be anchored to vertical supporting surface 49.

Figure 16:
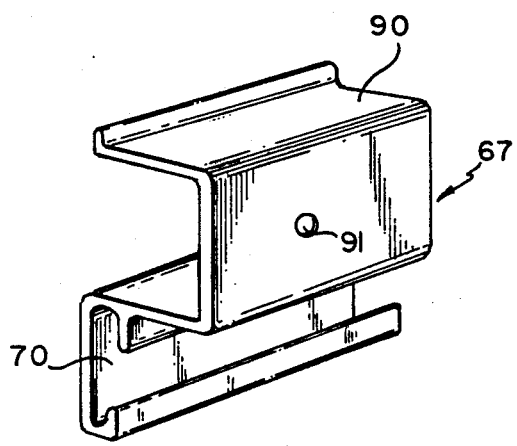
FIG. 16 is a view in perspective of an awning bracket holder.
Figure 17:
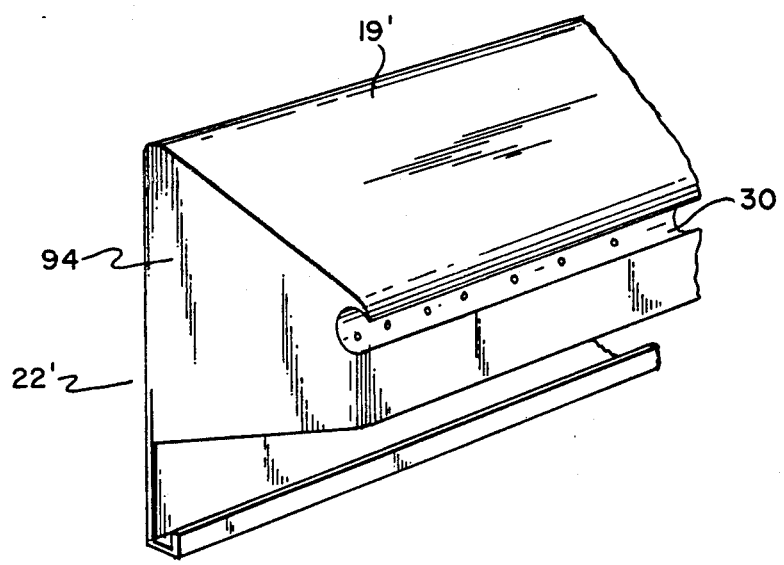
FIG. 17 is a view in perspective of the mounting bracket of FIG. 12.

The awning bracket holder comprises an upper portion 90 and an open-sided U-shaped channel 70. An end of the awning bracket is configured to be received within and supported by the channel 70. The awning bracket holder is also depicted in FIG. 16.

The awning rail comprises an open-sided channel 73 within which an end of the awning is received, the other end of the awning being retractably attached to a supporting pivot arm. The awning rail includes a planar supporting surface which extends from the wall 49. Awning rail 64 also includes a vinyl weather strip 93 which protects screw means 79 from the elements.

Figure 15:
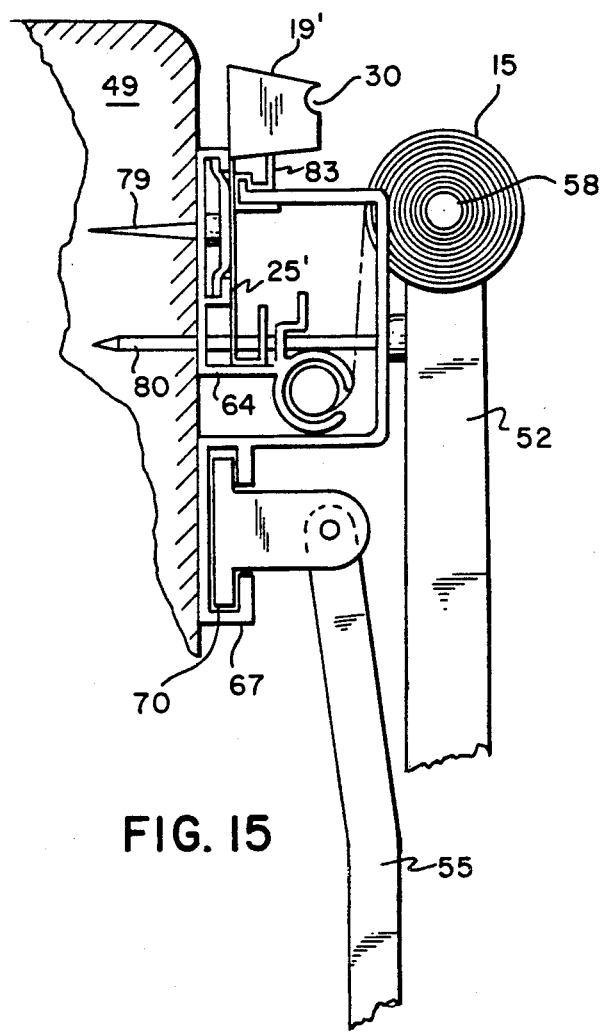
FIG. 15 a side view of the awning cover assembly of the present invention.

FIG. 15 depicts the awning rail and awning bracket holder of FIG. 13 in an assembled state together with a mounting bracket (and without the remainder of the hood). The awning is shown in retracted position supported by an awning bracket comprised of supporting arm 55 and pivot arm 52. An end of supporting arm 55 is receivably retained in awning bracket holder 67 in open-sided U-shaped channel 70. The free end of pivot arm 52 supports a retractable roller mechanism 58 to which an end of the awning 15 is attached. The other end of the awning is fixedly received in an opensided channel 73 in awning rail 64 attached to the vertical supporting surface 49 (FIG. 13).

The mounting means 19' (FIG. 12) includes a downwardly-extending second leg 25' which is adapted to be supported by planar supporting surface 78 of the awning rail (FIG. 13) during mounting of the awning cover.

Figure 14:
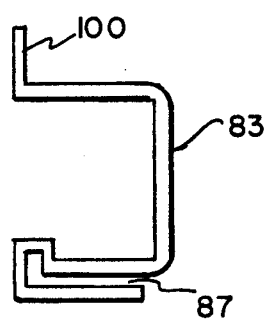
FIG. 14 is a side view of one embodiment of the connector means of the present invention.

Connector means 83 (FIGS. 14 and 18) is employed to support the awning bracket holder 67 within the assembly of FIG. 15. The awning bracket holder 67 (FIG. 16) includes an upper portion 90 which is receivably retained in channel 87 of the connector means, the channel being of a configuration corresponding to the configuration of the upper portion of the awning bracket holder 67.

The connector means 83 includes a planar extension 100 extending upwardly therefrom. Mounting means 19' (FIG. 12) includes an elongated slot 97 which is adapted to receive the planar extension 100 of the connector means 83.

Alternatively, connector means may engage a downwardly-extending second leg having slots 31 and corresponding fingers by insertion of one of said fingers into a correspondingly-configured slot in the connector means.

As shown in FIG. 15, screw means 79, 80 serve to attach the awning rail 64 and the awning bracket holder 67 to the vertical supporting surface. Screw means 80 also passes through the lower portion of leg 25' and serves to retain the mounting means 19' in position.

The assembly of FIG. 15 may thus be used with advantage to retrofit conventional awning bracket mounts to include the awning cover of the present invention. For example, connector means 83 is attached to awning bracket holder 67 in the manner shown. Mounting means 19' is engaged with the upper portion of the connector means. The assembled components are then attached to the vertical mounting surface by screw means 80 via mounting hole 91. Once so attached, the hood portion which includes the male portion of the C-clamp may be placed in engagement with the female portion of the C-hinge in raised position. Once so engaged, the hood may be lowered into protective position about the retracted awning.

Advantageously, the first leg 22' may include downwardly-extending side portions 94 which, upon downward displacement of the hood about the retracted awning, are received in a notched portion 34' in the rear of the hood. Thus, when the hood is placed in its lowermost position, lateral displacement of the hood is prevented due to the interfering nature of the downwardly-extending side portions of the first leg.

Figure 3:
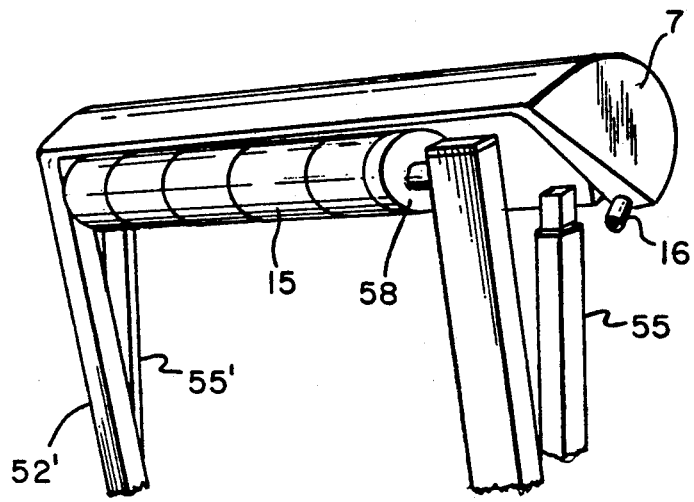
FIG. 3 is a view in perspective of one embodiment of the awning cover of the present invention in an installed partially raised position during extension of an awning.
Figure 4:
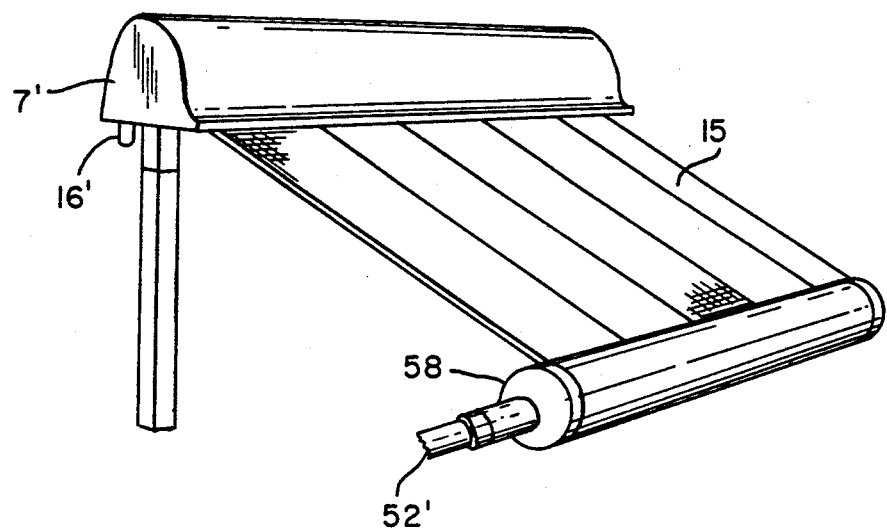
FIG. 4 is a view in perspective of one embodiment of the awning cover of the present invention in position subsequent to extension of the awning.
Figure 5:
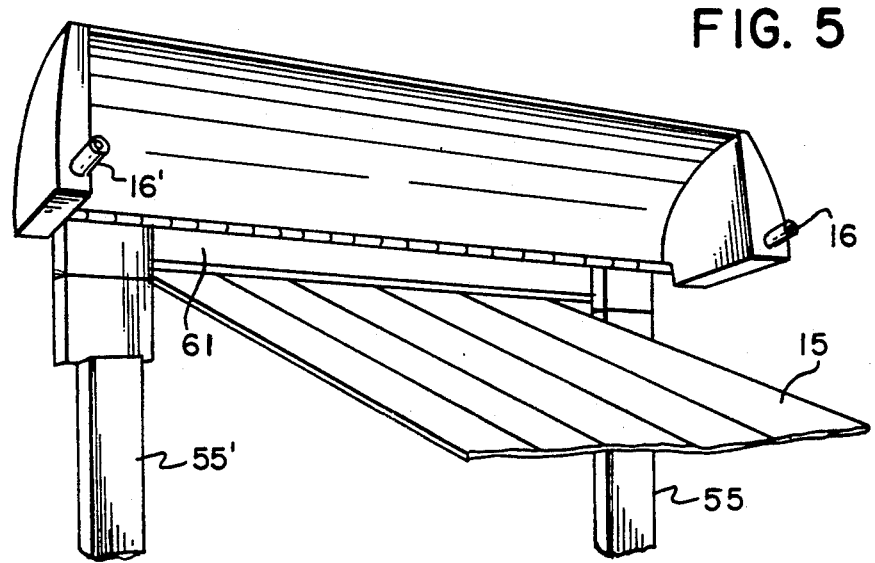
FIG. 5 is a view in perspective of one embodiment of the awning cover in fully raised position subsequent to extension of the awning.

By way of example, in operation the awning cover (once mounted in protective relationship to the awning 15 on the vertical mounting surface) normally is positioned in its downward-most position surrounding the top and side portions of the awning (FIG. 7), with the awning being supported at its free end by arms 55, 55' fixed to the mounting surface and intermediate supporting bar 61 and at its extendable end by retractable roller means 58. When it is desired to extend the awning during use of same, the awning cover is merely lifted upwardly and somewhat rearwardly to an extent sufficient to permit the awning to be rotated forward of the mounting surface on supporting pivot arms 52, 52' as shown in FIGS. 3 and 6. Once the awning is extended to its full extended position, the awning cover may be returned to its normal protective position as shown in FIG. 4. When it is again desired to place the awning in its retracted position for storage, the awning cover is again lifted upwardly and rearwardly as shown in FIG. 5 to permit the awning to be rewound about retractable roller means 58 and placed against the mounting surface 49 for storage. Once placed in a storage position, the awning cover is again permitted to assume its protective position.

The connector means may take other forms depending upon the type of awning bracket holder is employed to support the awning in place on the mounting surface.

Connector means 83,, may take the form as shown in FIG. 21. The connector means of FIG. 21 includes upper planar extension 115 and channel 118 adapted to cooperatively engage a correspondingly configured portion of the awning mounting bracket as shown in FIG. 22.

Figure 22:
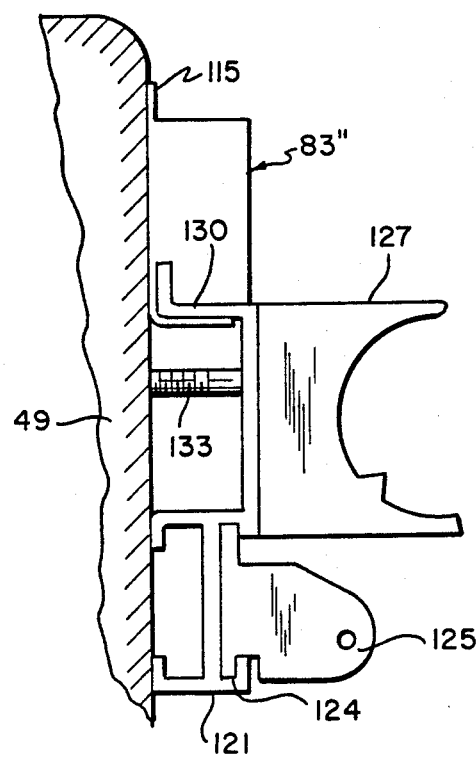
FIG. 22 is a side view of another embodiment of the awning bracket holder in combination with the connector means of FIG. 21.

In FIG. 22, awning mounting bracket 121 includes a lower portion 124 adapted to receivably retain an awning bracket 125 which supports arm 55 (not shown) as well as an upper portion 127 adapted to retain an end of the awning cover. The bracket also includes portion 130 which is received within channel 118 of connector means 83,, The awning bracket holder is fixed to the vertical mounting surface 49 by screw means 133. Connector means serves to attach the awning cover to the awning bracket in a manner similar to that depicted in FIG. 15; i.e. by cooperative engagement of the upper planar extension of connector means 83" with the mounting means of the awning cover.

The connector means 83' in another embodiment may take the form as shown in FIGS. 19 and 20. The connector means of FIGS. 19 and 20 includes upper planar extension 103 and lower planar extension 106, inclined mating surface 112, and mounting holes 109.

Figure 23:
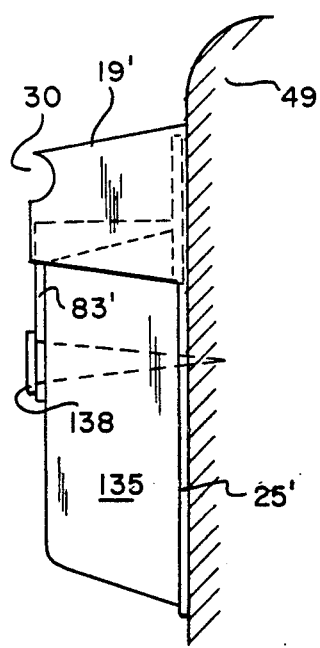
FIG. 23 is a side view of another embodiment of the awning bracket holder in combination with the connector means of FIGS. 19 and 20.

As shown in FIG. 23, connector 83' in use is seated upon mounting bracket 135. Mounting bracket 135 is attached to a vertical mounting surface 49 by bolt means 138 which also passes through one of the holes 109 in the connector 83'. Attachment means 19' cooperatively engages the connector 83' by insertion of the vertical planar surface 103 of the connector in a corresponding slot in the attachment means as shown. A downwardly extending leg 25' of the attachment means 19' is placed between the mounting bracket 135 and the mounting surface 49. Upon tightening of the bolt 138, the mounting bracket retains the leg 25' in position which in turn retains the attachment means 19' in position by action of the bolt on the connector 83'.

Figures 24, 25:
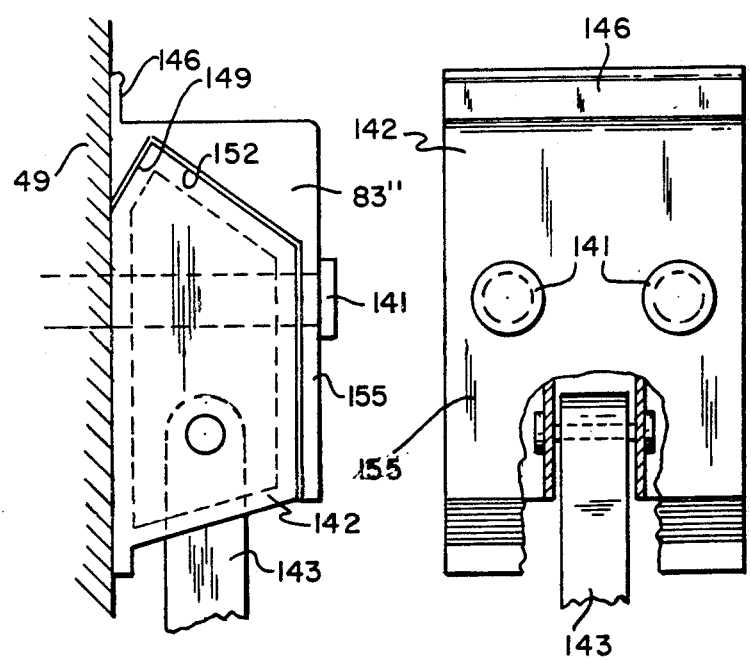
FIG. 24 a side view of an additional embodiment of the awning holder in combination with a different connector means.
FIG. 25 is a front view of the embodiment of FIG. 24.

In yet another embodiment of the connector means, FIGS. 24 and 25 depict connector means 83,,, placed in conforming relationship to awning holder 142. Connector means 83''' includes a vertically oriented planar surface 146 which extends upwardly from the top of the connector means. The connector means includes a front downwardly-descending planar portion 155 which is placed against the front of the awning holder. The connector means and the awning holder each include matching holes through which bolts 141 are placed to secure the assembly to the vertical mounting surface 49.

In the particular embodiment depicted, the topmost portion of the connector means includes intersecting inclined surfaces 149, 152 which together form an inverted "V" corresponding in shape to the top of the awning holder. The connector accordingly is seated upon the top of the awning holder when in use and bolted thereto via bolts 141.

The attachment means 19' is attached to the vertical planar surface 146 in the same manner as previously described for the other embodiments.

The awning cover of the present invention may, of course, be constructed of any acceptable material which provides long-term use to be achieved, is resistant to the elements and provides the requisite protection for the awning. The awning cover may thus be constructed of a metal such as aluminum or the like suitably painted to provide protection from the elements as well as to enhance the aesthetic value thereof. Molded plastic materials may also be employed with advantage.

The detailed description set forth is the preferred embodiment of the method of the present invention. However, certain changes may be made in carrying out the above method without departing from the scope of the invention; it is therefore intended that all matter contained in the above description shall be interpreted as illustrative and not in a limited sense. It is also to be understood that the following claims are intended to cover all of the generic and specific features of the invention herein described, and all statements of the scope of the invention, which as a matter of language, might be said to fall therebetween.

What is claimed is:

1. An awning cover particularly suitable for use in protecting awnings installed on recreational vehicles and mobile homes or the like, said awning cover comprising:

an elongated hood member including open rear and bottom portions, protective top and front portions, and opposing protective side portions extending rearwardly and downwardly from said front and top portions, respectively;

said front portion including a trough which extends along a lower edge thereof adapted to collect and divert water which runs downwardly from an upper portion of said hood member to said lower edge;

drainage means positioned in at least one of said side portions in communication with said trough to permit water collected by said trough to be diverted to and discharged from a side of said hood member; and an L-shaped mounting bracket having first and second legs, said first leg having an end joining said second leg and an end remote therefrom having means pivotally attached to the rear of said top portion of said hood member, said second leg comprising means for attaching said bracket to a vertical mounting surface, thereby permitting said hood member to be rotated upwardly and rearwardly upon mounting of said hood member on said vertical mounting surface.

2. The awning cover of claim 1 wherein said drainage means comprises a tubular member extending downwardly from at least one of said side portions.

3. The awning cover of claim 2 wherein a tubular member extends downwardly from each said side portion.

4. The awning cover of claim 1 wherein said front and top portions together define a curved surface which extends from a topmost rear portion of said hood member to a lowermost front portion of said hood member.

5. The awning cover of claim 3 wherein said drainage means in at least one side portion comprises an extension of said trough which extends along the lower edge of both side portions of said hood member, said trough extension including means which permits water in said trough to be discharged at the rear of said awning cover.

6. The awning cover of claim 1 wherein said second leg of said L-shaped mounting bracket includes multiple elongated downwardly-open slots.

7. The awning cover of claim 6 wherein said second leg includes slots of varied configuration and dimension.

8. The awning cover of claim 1 further comprising an elongated drainage trough along said rear of said top portion of said hood member connected to said drainage means.

9. The awning cover of claim 8 wherein said mounting bracket is attached to said top portion of said hood member by means of a hinge which extends along at least a portion of said top portion.

10. The awning cover of claim 9 wherein said hinge extends along substantially the entire lateral extent of said top portion of said hood member.

11. The awning cover of claim 1 wherein said rearward portion of said top surface of said hood member includes a notched portion extending inwardly from the rear of said hood member, with said first leg of said mounting bracket being of a size sufficient to cover said notched portion.

12. The awning cover of claim 7 wherein said second leg includes both square ended slots and round ended slots.

13. The awning cover of claim 1 wherein said drainage means extends downwardly from the bottom of said side portion.

14. The awning cover of claim 1 wherein said opposing side portions slope inwardly toward each other from the bottom of said side portion to the top of said side portion.

15. The awning cover of claim 8 wherein said first leg of said mounting bracket includes an inclined surface adapted to divert water to said drainage trough.

16. The awning cover of claim 10 wherein said hinge comprises a cylindrical element formed on one of said mounting bracket and said hood member, and pivotably received with an open-sided part-cylindrical element formed on the other of said mounting bracket and said hood member.

17. In an awning cover assembly for use in protecting an awning installed on recreational vehicles and mobile homes or the like, a first end of said awning being attached to a vertical mounting surface and a second end of said awning being connected to an extendable arm of an awning bracket supported on said vertical mounting surface by an awning bracket holder, the improvement wherein said awning cover assembly comprises:

an elongated hood member including open rear and bottom portions, protective top and front portions, and opposing protective side portions extending rearwardly and downwardly from said front and top portions, respectively;

an L-shaped mounting bracket having first and second legs, said first leg having an end joining said second leg and an end remote therefrom having means pivotally attached to the rear of said top portion of said hood member, said second leg comprising means for attaching said bracket to a vertical mounting surface, thereby permitting said hood member to be rotated upwardly and rearwardly upon mounting of said hood member on said vertical mounting surface, and connector means to cooperatively engage in fixed position both an upper portion of said awning bracket holder and said mounting bracket.

18. The awning cover assembly of claim 17 wherein a first end of said awning is attached to an awning rail, a portion of which extends from the side of a vertical mounting surface.

19. The awning cover of claim 18 wherein said awning rail comprises an open-sided channel adapted to receive said first end of said awning, said open-sided channel being supported by a planar supporting surface extending outwardly from said supporting surface.

20. The awning cover assembly of claim 18 wherein a lower portion of said awning bracket holder is adapted to receivably retain an end of said awning bracket to be supported on said vertical mounting surface.

21. The awning cover assembly of claim 20 wherein said connector means retains an upper portion of said awning bracket holder adjacent to said awning rail, and said connector means includes in a lower portion thereof a channel adapted to slidably receive said upper portion of said awning bracket holder, and means to attach an upper portion of said connector means to said mounting bracket.

22. The awning cover of claim 18 wherein said connector means includes a vertically oriented planar surface positioned adjacent said vertical mounting surface and a lower vertically oriented planar surface spaced from said vertical mounting surface and extending along a portion of said awning bracket holder.

23. The awning cover assembly of claim 17 wherein said front and top portions of said hood member together define a curved surface which extends from a topmost rear portion of said hood member to a lowermost front portion of said hood member.

24. The awning cover assembly of claim 17 wherein said mounting bracket is attached to said top portion of said hood member by means of a hinge which extends along at least a portion of said top portion.

25. The awning cover assembly of claim 24 wherein said hinge extends along substantially the entire lateral extent of said top portion of said hood member.

26. The awning cover assembly of claim 23 wherein said rearward portion of said top surface of said hood member includes a notched portion extending inwardly from the rear of said hood member, with said first leg of said mounting bracket being of a size sufficient to cover said notched portion.

27. The awning cover assembly of claim 17 wherein said first leg of said mounting bracket includes an inclined surface adapted to divert water toward the front cf said hood member.

28. The awning cover assembly of claim 24 wherein said hinge comprising a cylindrical element formed on one of said mounting bracket and said hood member, and pivotably received with an open-sided part-cylindrical element formed on the other of said mounting bracket and said hood member.

29. The awning cover assembly of claim 17 wherein a lower portion of said downwardly extending second leg is adapted to be supported by an awning rail extending outwardly from said vertical mounting surface.

30. The awning cover assembly of claim 29 wherein said second leg of said mounting bracket includes a U-shaped bottom portion adapted to be supported by said awning rail.

31. The awning cover assembly of claim 21 wherein said awning bracket holder receivably retains said end of said awning bracket within an open-ended U-shaped channel within which said end of said awning bracket is slidably received.

32. The awning cover assembly of claim 21 wherein said upper portion of said awning bracket is slidably received within a L-shaped channel in said connector means, the configuration of which corresponds to the configuration of said upper portion of said awning bracket.

33. The awning cover assembly of claim 21 wherein said upper portion of said connector means is substantially planar in configuration and extends vertically therefrom, with said mounting bracket including a slot for receiving said upper portion of said connector means.

34. The awning cover of claim 22 wherein said connector includes an inclined surface supported upon an upper portion of said awning bracket holder.

35. The awning cover of claim 34 wherein said connector includes intersecting inclined surfaces supported upon an upper portion of said awning bracket holder.

* * * * *